US008546284B2

(12) United States Patent
Thippareddy et al.

(10) Patent No.: US 8,546,284 B2
(45) Date of Patent: Oct. 1, 2013

(54) PROCESS FOR THE PRODUCTION OF PLASMA SPRAYABLE YTTRIA STABILIZED ZIRCONIA (YSZ) AND PLASMA SPRAYABLE YSZ POWDER PRODUCED THEREBY

(75) Inventors: Aruna Singanahalli Thippareddy, Bangalore (IN); Balaji Narayanawamy, Bangalore (IN); Rajam Karaikudi Sankaranarayana, Bangalore (IN)

(73) Assignee: Council of Scientific & Industrial Research, New Delhi (IN)

( * ) Notice: Subject to any disclaimer, the term of this patent is extended or adjusted under 35 U.S.C. 154(b) by 632 days.

(21) Appl. No.: 12/436,629

(22) Filed: May 6, 2009

(65) Prior Publication Data

US 2010/0048379 A1    Feb. 25, 2010

(30) Foreign Application Priority Data

May 7, 2008    (IN) .......................... 1143/DEL/2008

(51) Int. Cl.
*C04B 35/48*    (2006.01)
*C04B 35/49*    (2006.01)
*C08K 3/00*    (2006.01)

(52) U.S. Cl.
USPC .......................................... 501/103; 106/450

(58) Field of Classification Search
USPC ................. 501/103; 264/5, 13, 14; 106/450; 427/215
See application file for complete search history.

(56) References Cited

U.S. PATENT DOCUMENTS

| | | | | |
|---|---|---|---|---|
| 3,957,500 A | * | 5/1976 | Pitts | 501/103 |
| 4,913,961 A | * | 4/1990 | Jones et al. | 428/332 |
| 5,320,675 A | * | 6/1994 | Dransfield et al. | 106/450 |
| 5,866,271 A | * | 2/1999 | Stueber et al. | 428/545 |
| 6,071,627 A | * | 6/2000 | Yasuda et al. | 428/610 |
| 6,869,550 B2 | * | 3/2005 | Dorfman et al. | 264/5 |
| 6,893,994 B2 | | 5/2005 | Wallar | |
| 6,902,814 B2 | * | 6/2005 | Takahashi et al. | 428/432 |
| 7,799,716 B2 | | 9/2010 | Mueller | |
| 7,833,469 B2 | | 11/2010 | Swartzlander | |
| 7,931,836 B2 | | 4/2011 | Xie | |

FOREIGN PATENT DOCUMENTS

| | | |
|---|---|---|
| CN | 1124184 | 6/1999 |
| IN | 1284/CHE/2005 | 9/2005 |

OTHER PUBLICATIONS

Ramaswamy et al., "A simple method•for the preparation of plasma-sprayable-powders based on ZrO2" *J. Mater. Sci.*, 31:6325-6332; 1996.

(Continued)

*Primary Examiner* — Noah Wiese
(74) *Attorney, Agent, or Firm* — DLA Piper LLP (US)

(57) ABSTRACT

Most widely used commercial zirconia powders are composed of porous particles 10-105 μm and 45-75 μm in size. Furthermore, these powders are mixtures of tetragonal, cubic, and monoclinic modifications, which indicate the heterogeneous distribution of the stabilizing yttria dopant in finished powder not suitable for Solid oxide fuel cell applications. Most of the methods reported in the prior art employs an additional agglomeration step which makes the process more expensive and laborious, Present invention provides a simple and economical process for the preparation of plasma grade yttria stabilized zirconia powder useful for applications in solid oxide fuel cells (SOFC) and thermal barrier coatings without the agglomeration step. Plasma grade yttria stabilized zirconia powders of present invention are prepared at different mole % of yttria varying from 3 to 12%. Finished powder has particle size varying between 33-51 μm and flowabilty of 30-54 seconds per 50 gm of powder having particle morphology ranging from almost spherical to blocky angular shape.

24 Claims, 8 Drawing Sheets

OTHER PUBLICATIONS

Sherif and Shyu; "Emulsion precipitation of Yttria-stabilized zirconia for plasma spray coatings," *Journal of the American Ceramic Society*; 74:375-380; 1991.

Belov et al., "Preparation of Spherical Yttria-Stabilized Zirconia Powers by Reactive-Spray Atomization", *Journal of the American Ceramic Society*, 80:982-90; 1997.

* cited by examiner

PROCESS FOR THE PRODUCTION OF PLASMA SPRAYABLE YTTRIA STABILIZED ZIRCONIA (YSZ) AND PLASMA SPRAYABLE YSZ POWDER PRODUCED THEREBY

FIELD OF THE INVENTION

The present invention relates to a process for the production of plasma sprayable yttria stabilized zirconia (YSZ) and plasma sprayable YSZ powder produced thereby. The present invention particularly relates a simple and economical process for the preparation of plasma grade yttria stabilized zirconia (YSZ) powder useful for applications in solid oxide fuel cells (SOFC) and thermal barrier coatings (TBC) without the agglomeration step. The present invention more particularly relates to a process for the manufacture of plasma sprayable 3 to 12 mol % yttria stabilized zirconia (YSZ) powders without any agglomeration process.

Although extensive studies have been carried out on the chemical synthesis of ceramic oxide powders, only few efforts have been directed towards preparing chemically uniform oxide powders for plasma spray coatings. Zirconia powder is useful in many advanced structural and electrical ceramics application. Because of its good ionic conductivity, it is used as an electrolyte in solid oxide fuel cells and because of its low thermal conductivity and relatively high thermal expansion coefficient it has been used as good thermal barrier coating in heat engines. Addition of yttrium oxide to zirconia provides the phase stability to finished powder product. Thus, plasma sprayable yttria stabilized zirconia powder finds applications as electrolyte in solid oxide fuel cells, as oxygen sensor and also as a thermal barrier coating. The powder is also typically coated on the engine parts by plasma spray techniques. The plasma spray technology requires powder with good flowability and large particle size. Powder particle diameters are generally between 5 and 200 μm with a preferred range of 20-100 μm and a median diameter of 50 μm for atmospheric plasma spray applications (Ref: R. B. Heimann, Plasma Spray Coating: Principles and Applications, VCH publishers, Weinheim, 1996). Individual particles cannot be thermally sprayed because of their low mass and the resultant inability to be carried in a moving gas stream and deposited on a substrate. To overcome this, reconstitution of individual particles into micrometer sized granules is necessary. Many materials can be converted into powders by a variety of techniques to yield spray powders.

To produce plasma sprayable powders, precursor materials are melted or sintered with subsequent size reduction by crushing, grinding and attrition milling. Mixing of powders and classification are also some of the process steps. Specialized powders for a variety of industrial applications are being produced by spray drying, fluidized bed sintering, agglomeration, fusing/melting, plasma spheroidizing, atomizing, surface coatings and sol-gel processes. Most of the methods reported in the literature employs an additional agglomeration step to get plasma sprayable powders makes these processes more expensive and laborious. The agglomeration processes include pelletizing, pressing or spray drying. Most commercial powders of YSZ are prepared by blending individual oxides, and then melting, thermally spraying or rapidly solidifying them. These processes often result in molecularly non-uniform compositions with variable mixtures of cubic, tetragonal and monoclinic zirconia. Also morphology and particle-size distribution of commercial powders intended for plasma spraying are rather far from ideal and not likely to be improved under existing solid-state technology. For example, most widely used commercial zirconia powders are composed of porous particles 10-105 μm and 45-75 μm in size. Furthermore, these powders are mixtures of tetragonal, cubic, and monoclinic modifications, which indicate the heterogeneous distribution of the stabilizing yttria dopant in finished powder which is likely to induce undesirable properties for the plasma sprayed coating.

Prior-art search was made in patent as well as non-patent literature, related to preparation of plasma sprayable yttria stabilized zirconia powder. Following patents and papers are referred due to their relevance to field of present invention.

Reference may be made to the Chinese patent CN112418A, wherein zirconium oxide plasma spraying powder and codeposition coagulation/sintering method is disclosed. The characteristics of the method are the addition of coagulating agent in the co-deposition and introduction of stalling process after washing, and controlling the formation of aggregate in all the co-deposition, aging, filter washing and sintering processes. Co-precipitation was carried out at 50-90° C. using 0.2-1.5 M $ZrOCl_2$, 2-6 wt % $NH_3$. Polyacrylamnide and polyethylene w used during co-precipitation. The precipitate was stirred for 72 h, dried at 150° C. for 24 h and sintered at temperatures 800-1100° C. The final pH was 8-11 and titration speed was 8-25 ml/min. The flowability value was 60 s/50 g and the particle size range was 5-125 μm. This invention disclosure does not describe the particle shape, plasma sprayable coating with this powder and also the yield of the product. Also the disclosed process makes use of polyacrylamide, polyethylene and the co-precipitation reaction is carried out at high temperature. Total synthesis time required for the preparation of YSZ powder is almost touching to 100 hrs.

Reference may also be made to Indian Patent Application 1284/CHE/2005 disclosing the industrial process for the manufacture of stabilized zirconia plasma sprayable powder. A method for preparing stabilized zirconia based plasma sprayable powder comprises: stabilizing monoclinic $ZrO_2$ by adding suitable additives and subjecting the mixture to the step of arc melting; crushing the stabilized mixture to form fine particles; preparing a slurry of the stabilized $ZrO_2$ particles, subjecting the slurry to the step of spray drying; and sieving the spray dried powder to obtain free flowing plasma sprayable powders. Thus this invention provides a multi-step and expensive manufacturing process for yttria stabilized zirconia. Also the powder prepared is not homogeneous.

Reference may also be made to the preparation of plasma-sprayable powders by P. Ramaswamy, S. Seetharamu, K. B. R. Varma and K. J. Rao, J. Mater. Sci., 31 (1996) 6325-6332, wherein preparation of plasma-sprayable grade zirconia powder for TBC application is achieved by (i) wet ball milling m-$ZrO_2$ and $Y_2O_3$ in agate media for 24 h and oven drying at 423K, followed by calcination at 1423 K for 12 h and again ball milling for 4 h; oven drying (ii) the dried powders were mixed with 10% polyvinyl alcohol and compacted into flat rectangular bars (10 cm×10 cm×0.5 cm). (iii) the bars were heated to about 2073 K in an oxy-acetylene flame. Then it was ball-milled for about 8 h and the slurry was oven dried. (iv) Small agglomerates of the powder were formed by mixing the powder composition with 10% PVA in a planetary mixer, and then oven dried for 2-3 h in order to remove the moisture (v) To retain particles with sizes ranging from 45-90 μm, the dried powder was sieved through 170 and 300 mesh. The process described above involves multi steps, laborious, time consuming (~50 h). The reported yield % was 80 and the average agglomerated size was higher (>70 μm). The powder contains particles with various shape and the flowability values of the powders are not reported. An important disadvantage apart from multi-steps, time consuming is the non-uniformity of the product as the whole process is based mainly on physical mixing and heat treatment and also for large scale preparation this process will not be feasible. This process is similar to the one described above except the spray drying step.

Reference may be made to the preparation of tetragonal YSZ by emulsion co-precipitation useful for TBC applications by F. G. Sherif and L-J Shyu, "Emulsion precipitation of Yttria-stabilized zirconia for plasma spray coatings", Journal of the American Ceramic Society, 74 (1991) 375-380, wherein plasma sprayable YSZ powder has been prepared using emulsion precipitation. This process involves the following steps (i) refluxing yttrium acetate and zirconium butoxide in toluene and water followed by gelling, filtration, drying, milling, sieving again followed by calcination and separation (ii) Yttrium isopropoxide in toluene was refluxed with zirconium n-propoxide in propanol under nitrogen, followed by distillation, followed by dilution with heptane, addition of water, gelling, oven-drying, milling, sieving and again calcined and sieved. (iii) Yttrium acetate and zirconium acetate was emulsified in a water-in-oil emulsion, followed by stirring addition of a precipitating agent, centrifuging, washing with water and heptane, drying and then calcination and classification. This process yields particles with a median particle size of 50-55 µm with irregular to solid and hollow sphere shaped particle morphologies. The flowability values reported are in the range of 0.9-2.1 $cm^3/s$. The paper does not report the yield of the product. This process is not feasible for large-scale preparation because of the use of costly alkoxides and surfactants, uses organic solvents which are not environmentally friendly.

Reference may also be made to the preparation of spherical yttria stabilized zirconia powders by reactive spray atomization by V. Belov, I. Belov, L. Harel, Journal of the American Ceramic Society, 80 (1997) 982-90. The process is based on spraying zirconia sol (zirconium basic carbonate, yttrium oxide, zirconium oxychloride, zirconium sulfate) into an ammonia water solution, followed by drying of the gel precipitate and calcination. Sol-gel transformation was conducted by spraying the sol into a chamber containing a vessel with an ammonia-water solution. The stream of sol droplets created by the ultrasound spray nozzle after contact with ammonia transformed into a gel precipitate consisting of transparent solid spheres of coprecipitated zirconium-yttrium hydroxides. The prepared ZY gel precipitates were water washed until no chloride ions could be detected in the washing liquor. Then the precipitates were dried at temperatures to 50-300° C. and calcined at temperatures 400-1850° C. This process also involves multi-steps and higher calcination temperatures are being used.

USPTO patent application US2007176332 discloses a method of making a solid electrolyte-YSZ product, where the method includes the step of providing a powdered mixture of zirconia, yttria and about 2%, by wt., or less of a metal oxide, where yttria-stabilized zirconia is not added to the mixture. The method also includes sintering the powdered mixture at about 1500 □C or less, for about 5 hours or less, to form a reaction sintered YSZ. Also, a method of making a fuel cell electrolyte that includes the step of forming a green body that includes zirconia, yttria and about 2%, by wt., or less of a metal oxide, where yttria-stabilized zirconia is not added to the green body. The method also includes shaping the green body into a form of the electrolyte, and sintering the green body at about 1500° C. or less to form a reaction sintered yttria-stabilized zirconia and metal oxide electrolyte. Here, the sintering of powder is carried out at higher temperatures.

Reference may be made to USPTO U.S. Pat. No. 6,869,550 B2, which discloses a method of producing a pre-alloyed stabilized zirconia. A pre-alloyed stabilized zirconia powder suitable for use in thermal barrier applications is formed by alloying zirconia with a stabilizer, such as yttria, and processing the alloyed stabilized zirconia to form a very fine powder. The raw powder is then spray dried using carboxymethylcellulose (CMC) binder, Nopcosperse dispersant to produce an agglomerated powder having an average particle size suitable for use in spray coating applications. An important drawback of this process is again the use of spray drying process and hence it is laborious.

Reference may also be made to USPTO patent application US2007/0110655 A1, which discloses a method for making high purity and free flowing metal oxides powder. The metal oxide powders manufactured using flame pyrolysis, agglomeration, fusing and crushing, chemical precipitation is processed using a plasma apparatus. The process consists of in-flight heating and melting of the feed materials by the plasma torch. The heated powder forms molten spherical droplets that are rapidly cooled under free fall conditions. An important drawback of this process is again the use of agglomeration process.

Reference may be made to USPTO patent application US2007/0207271 A1, which provides a low density and porous zirconia powder partially alloyed with one or more of yttria, Scandia, dysprosia, ytterbia etc. The method of making a partially-alloyed zirconia composite powder is provided which includes the steps of (i) either providing an agglomerated powder formed by spray drying, mechanical cladding, or attrition milling or providing a chemically derived zirconia composite powder that contains proper amount of yttria, Scandia etc. and sintering the agglomerated powder or chemically derived powder by heating the powder to at least 1400° C., or light plasma densification of physically agglomerated or chemically derived zirconia composite powder or a combination of sintering and plasma densification. The process appears to be laborious and expensive.

Reference may be made to USPTO patent U.S. Pat. No. 6,893,994, which discloses a method for the preparation of spheroid hollow zirconia thermal spray powders suitable for application of a TBC. The stabilized zirconia is preferably formed by electrofusion of zirconia and a stabilizing oxide followed by the step of comminuting and heat treatment by plasma spray gun (plasma fusing) or a flame spray gun. The zirconia feedstock was stabilized with a rare earth metal oxide by electrofusion. The stabilizing oxide, preferably yttria is arc fused with the zirconia at a temperature range of about 2750-2950° C. such that the components are completely molten. The molten material is rapidly cooled with water or air such that the melt flow is broken up into a flow of droplets. This melt was comminution followed by spray drying and further heat treatment by plasma fusion process. Important drawbacks of this process are (I) Use of very high temperatures; (II) involves multi-steps and (III) expensive.

As discussed herein above, most commercially available yttria stabilized zirconia (YSZ) powders are made by blending individual oxides, and then melting, thermally spraying, or rapidly solidifying them. These processes are multi-step and often results in molecularly non-uniform and heterogeneous compositions. If such powders are used for plasma spraying it is likely to impart undesired properties to the coating.

The main objective of the present invention is to provide a A photograph showing plasma-sprayed 8YSZ coating on ceramic tubes is shown in FIG. 2 process for the production of plasma sprayable yttria stabilized zirconia (YSZ), which obviates the drawbacks of the hitherto known prior art.

Another objective of the present invention is to provide a simple and economical process for the production of plasma sprayable yttria stabilized zirconia (YSZ), which obviates the drawbacks of the hitherto known prior art.

Yet another objective of the present invention is to provide a simple and economical process for the preparation of plasma grade yttria stabilized zirconia (YSZ) powder, which obviates the drawbacks of the hitherto known prior art.

Still another objective of the present invention is to provide plasma sprayable grade yttria stabilized zirconia powder suitable for solid oxide fuel cells (SOFC) and thermal barrier coatings (TBC) applications.

Still yet another objective of the present invention is to synthesize plasma sprayable grade YSZ powders without any agglomeration step.

A further objective of the present invention is to synthesize plasma sprayable grade YSZ powders without using stalling process.

A yet further objective of the present invention is to provide easy scale up and reproducibility in manufacturing process for plasma sprayable yttria stabilized zirconia.

Figure 4:
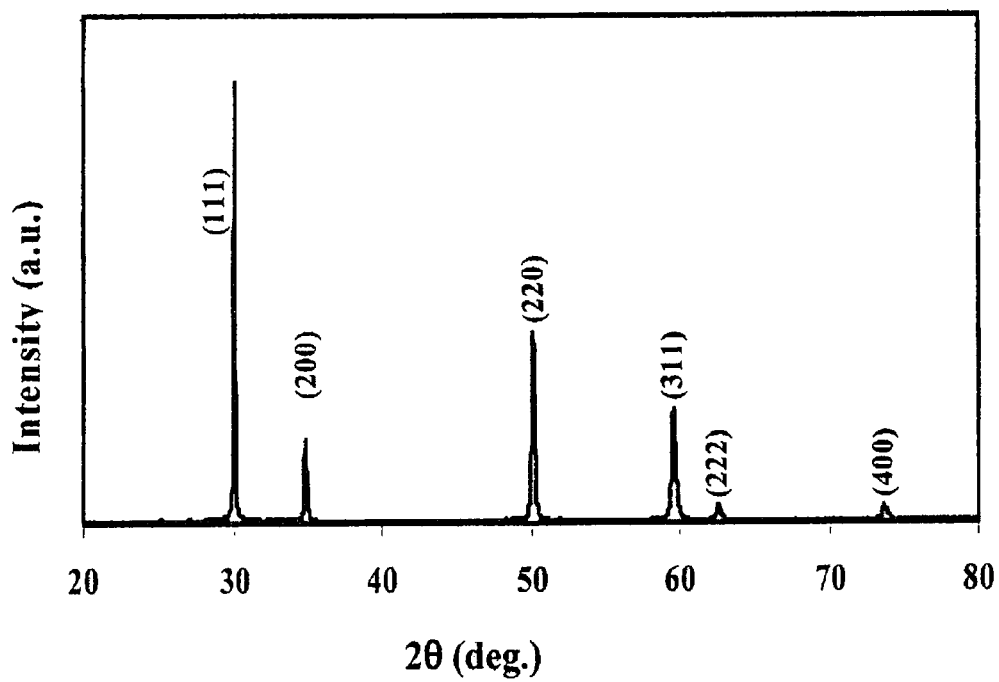

In FIG. 4 of the drawings accompanying this specification is shown the XRD pattern of plasma coating sprayed using 8YSZ particles prepared using ammonium sesquicarbonate as precipitating agent and $ZrOCl_2$ as precursor.

Figure 5:
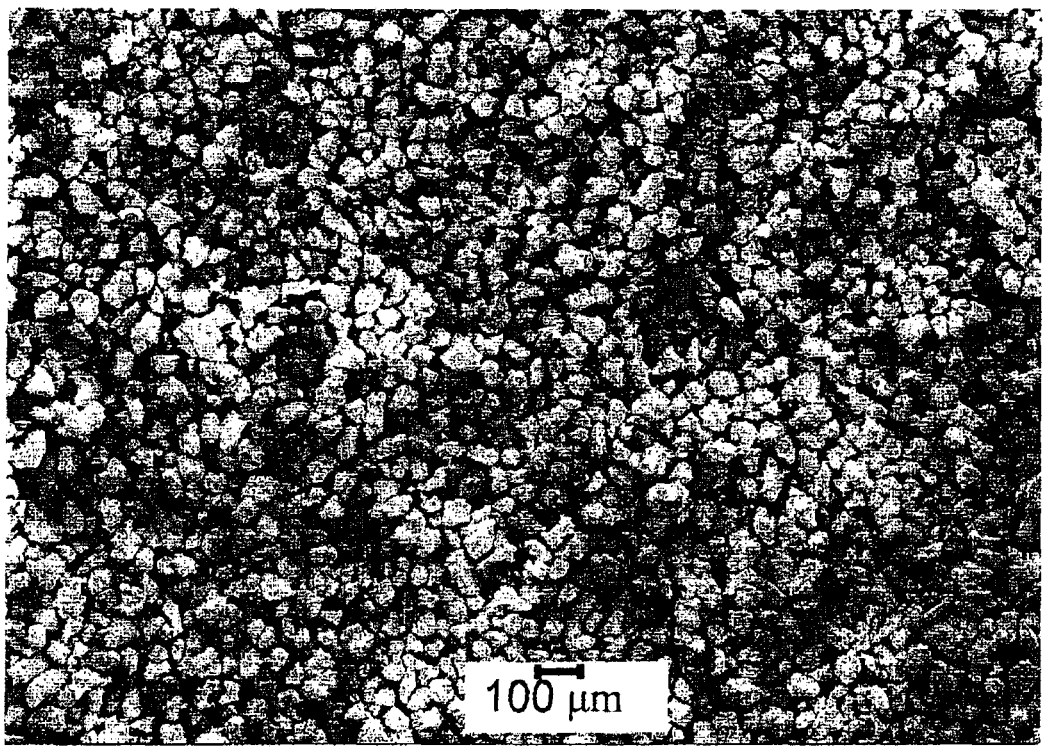

In FIG. 5 of the drawings accompanying this specification is shown the SEM image of 8YSZ particles prepared using ammonium sesquicarbonate using reverse co-precipitation and $ZrOCl_2$.

Figure 6:
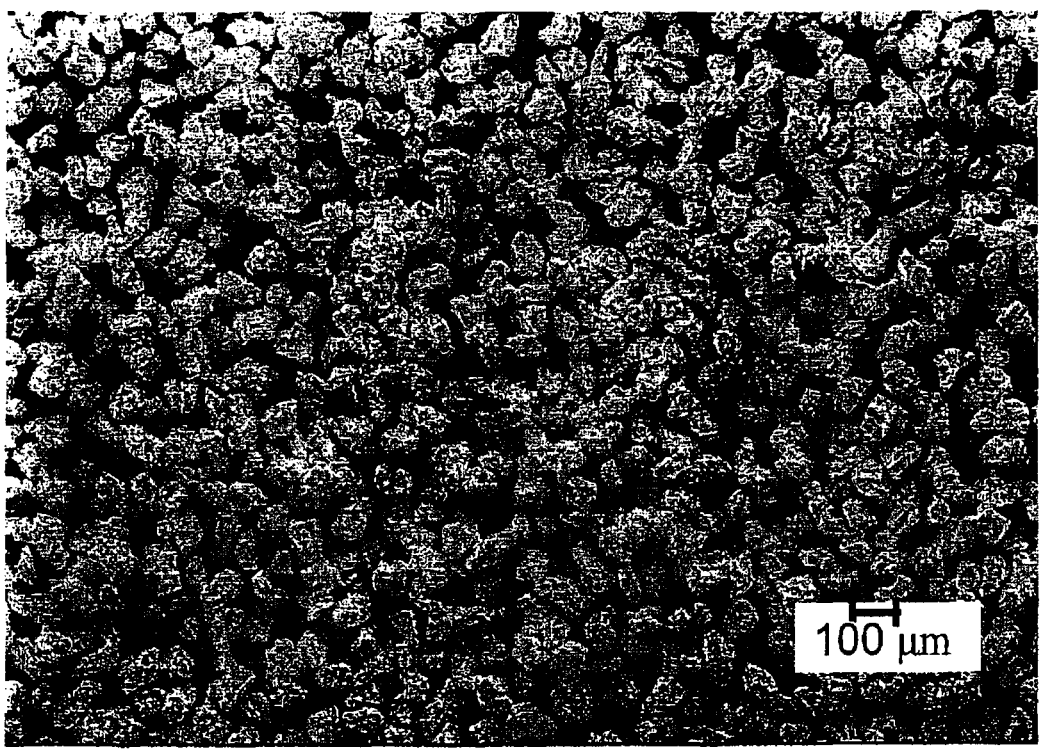

In FIG. 6 of the drawings accompanying this specification is shown the SEM image of 8YSZ particles prepared using microwave drying step.

Figure 7:
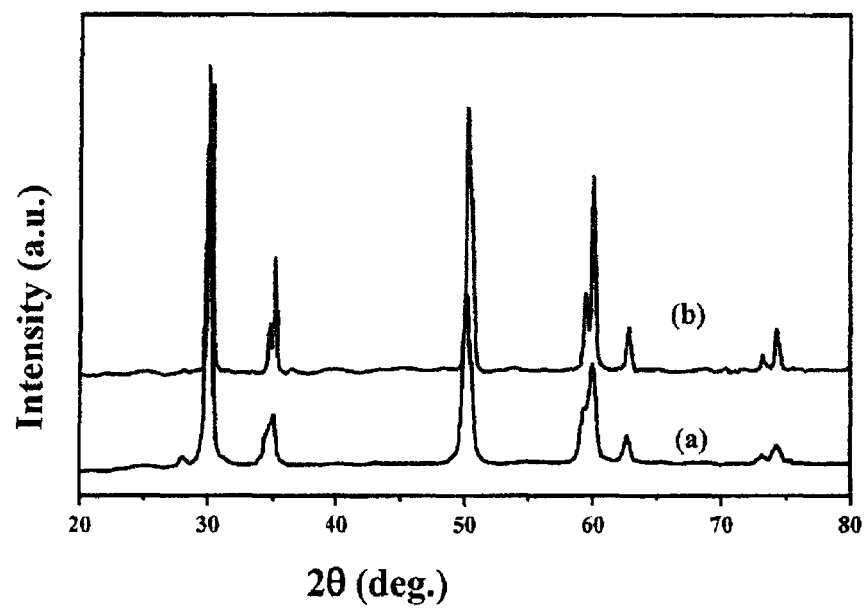

In FIG. 7 of the drawings accompanying this specification is shown the XRD of (a) as-prepared 3YSZ plasma sprayable powder and (b) plasma sprayed coating.

Figure 8:
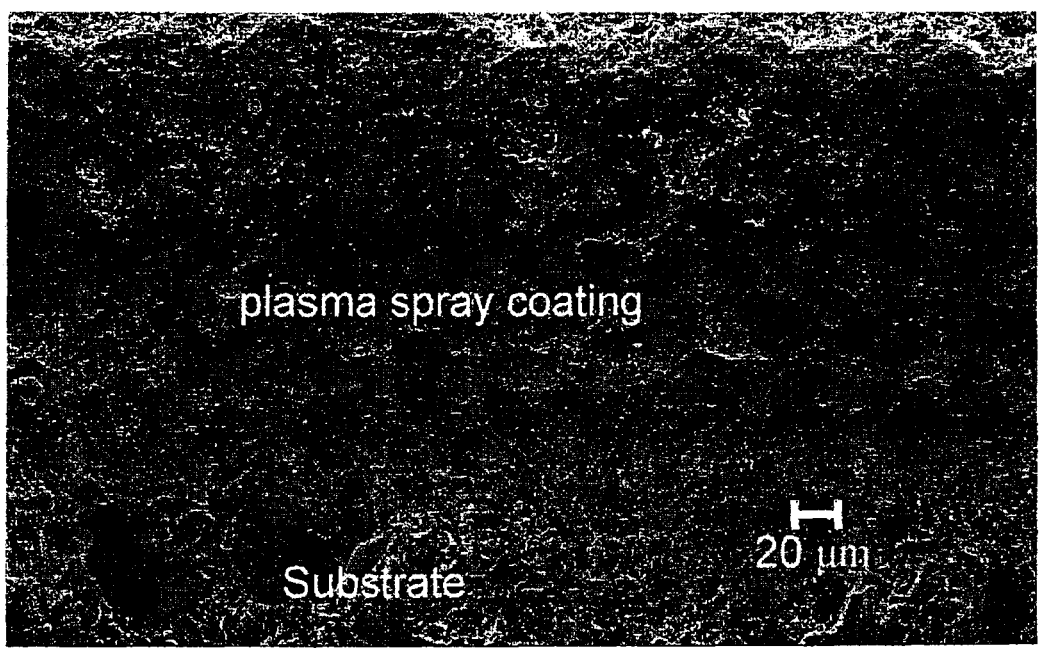

FIG. 8 shows plasma sprayed on a substrate.

In the present invention there is provided a process for the production of plasma sprayable yttria stabilized zirconia (YSZ) and plasma sprayable YSZ powder produced thereby, which is a simple, economical and fast process for the preparation of plasma sprayable yttria stabilized zirconia with the required particle size and good flowability without any agglomeration steps like spray drying which has been used in prior art. The plasma spray grade yttria stabilized zirconia powder of the present invention are prepared at different mole % of yttria varying from 3 to 12% and finished powder has the desired phase, average agglomerated particle size in between 33-51 µm and flowablity values ranging from 30 to 54 seconds per 50 gm of powder having particle morphology ranging from almost spherical to blocky angular shape; which is very good indicator for plasma spraying. This plasma grade YSZ powder is prepared without use of any agglomeration step in synthesis process unlike spray drying. The plasma grade YSZ powder is useful for applications in solid oxide fuel cells (SOFC) and thermal barrier coatings (TBC).

The process for the production of plasma sprayable yttria stabilized zirconia (YSZ) of the present invention has the following novel features:
 (I) Synthesis is carried out at room temperature by using readily available cheaper raw materials.
 (II) No agglomeration steps like spray drying are involved in synthesis of plasma sprayed powder.
 (III) Fast synthesis: total synthesis time of the present invention is 35-45 hours, which is significantly lower than the prior art method (100 hours—CN112418A).
 (IV) Further synthesis time can be reduced by 10 h by dehydrating the precipitate in microwave oven.
 (V) Productive process: Yield is of the order of 75%.
 (VI) Process can be customized for preparing any combination of $Y_2O_3$ and $ZrO_2$.
 (VII) Good reproducibility.
 (VIII) Potential for large scale production.

Phase pure, flowable YSZ powder capable of producing finished product by plasma spray process is obtained by the process of present invention, without the use of any agglomerative step in synthesis process unlike spray drying, thus making the process simpler and in-expensive.

The novelty of the present invention has been achieved particularly by the following non-obvious inventive steps in preparation of plasma grade yttria stabilized zirconia.
 Selection of precipitating agent.
 Temperature of the reaction mixture during precipitation.
 Solution concentrations.
 Dehydration of precipitate/microwave drying.
 Calcination temperature and duration.

Accordingly the present invention provides a process for the production of plasma sprayable yttria stabilized zirconia (YSZ), which comprises:
 (a) dispersing yttrium (Y) precursor in distilled water to obtain dispersed yttrium precursor;
 (b) dissolving the said dispersed precursor in concentrated nitric acid to get acidic solution of yttrium nitrate precursor;
 (c) heating and simultaneously adding zirconia (Zr) precursor to the said acidic solution of yttrium nitrate precursor;
 (d) subjecting the solution so obtained to magnetic stirring for at least 30 minutes to effect thorough molecular mixing in the nitrates precursor solution;
 (e) adding precipitating agent to the resultant nitrates precursor solution till pH of solution reaches to 10;
 (f) allowing the precipitate of Y and Zr to settle;
 (g) filtering the said precipitate;
 (h) washing the precipitate with distilled water followed by ethanol;
 (i) drying the washed precipitate; and,
 (j) calcining the said dried precipitate.

In an embodiment of the present invention, yttria precursor is selected from the group of oxide containing yttrium such as yttrium oxide.

In another embodiment of the present invention, zirconia precursor is selected from the group of metal nitrates and chlorides containing zirconia such as zirconium nitrate, zirconium oxy nitrate and zirconium oxychloride.

In still another embodiment of the present invention, the precipitating agent is selected from ammonium carbonate group.

In yet another embodiment of the present invention, the preferred precipitating agent is ammonium sesquicarbonate.

In still yet another embodiment of the present invention, the precipitation is carried out at room temperature.

In a further embodiment of the present invention, the precipitating agent is added to nitrate precursor solution or vice versa to get different morphology of powders.

In a still further embodiment of the present invention, the precipitate is allowed to settle preferably for an overnight period of the order of 2-12 hours.

In a yet further embodiment of the present invention, the precipitate is allowed to settle for a period of about 2 hours when dehydration is carried out in microwave oven.

In another embodiment of the present invention, the drying of washed precipitate is carried out in an electric oven at a temperature of the order of 120 □C for a period of about 12 hours.

In still another embodiment of the present invention, the drying of washed precipitate is carried out in an electric oven at a temperature of the order 120 □C for a period of about 8 hours and subsequently roasting of the dried precipitate on a hot-plate for a period of about 30 minutes.

In yet another embodiment of the present invention, calcination of dried precipitate is carried out in a muffle furnace at temperatures ranging from 700 to 1050 □C for a period of 10 to 30 hours.

Accordingly the present invention provides plasma sprayable YSZ powder produced by the process for the production of plasma sprayable yttria stabilized zirconia (YSZ) as herein described.

In an embodiment of the present invention, the plasma sprayable YSZ powder produced contains 3 to 12 mole % of yttria having particle size between 33-51 µm and flowabilty of 30-54 seconds per 50 gm of powder having particle morphology ranging from almost spherical to blocky angular shape.

There are several methods in prior-art for the preparation of ceramic oxides such as sol-gel, solution combustion, hydrothermal, co-precipitation, reverse micellar etc. Sol-gel method involves costly alkoxides for the preparation and usually the resulting product is very fine powder without flowability. Solution combustion method has the advantage of fast synthesis with cheaper chemical but it is associated with problems of scaling-up and very fine powder is obtained. Hydrothermal is a expensive and difficult to scale-up process whereas reverse micellar process employs organic solvents and surfactants and usually it yields nano size particles and washing of the powders is a significant and time consuming step.

Co-precipitation is the most popular technique that has been used in industrial applications because of its cheap raw materials, ease of handling and large scale production. It has the significant advantage (over solid-state synthesis "grind-and-fire" methods) of potentially placing the component metal ions within atomic distances of each other, greatly facilitating solid state diffusion and minimizing the risk of unwanted phase formation. Furthermore, co-precipitation avoids the grinding steps inherent in solid-state synthesis, which can ultimately lower phase purity by the incorporation of grinding media.

The present invention involves the following features for the preparation of plasma sprayable yttria stabilized zirconia:
(i) Selection of suitable precursors for Yttria and Zirconia which are cheaper and readily available and ease of handling unlike the alkoxides. The precursors chosen were $Y_2O_3$ dissolved in nitric acid and $Zr(NO_3)_4$/$ZrOCl_2$.
(ii) Selection of a suitable precipitating agent: (a) carbonates, unlike most hydroxides, are nongelatinous and show much weaker aggregation after drying and (b) rare earth elements form carbonate solid solutions readily, which allows high cation homogeneity in the precursor and hence can reduce the formation temperature. But due to high ammonium content of ammonium carbonate complete precipitation is difficult to achieve. This limitation can be overcome by using ammonium hydrogen carbonate $NH_4HCO_3$ which has much lower ammonium content than ammonium carbonate. In the present invention ammonium sesquicarbonate which is a mixture of ammonium bicarbonate ($NH_4HCO_3$) and ammonium carbamate ($NH_2COONH_4$) was chosen as the precipitating agent. Ammonium carbamate induces the same effect as that of ammonia. Thus ammonium sesquicarbonate provides the advantages of ammonium bicarbonate and ammonia solution. The co-precipitation has been carried out at room temperature to avoid the formation of smaller particles. Higher reaction temperature during co-precipitation leads to de-agglomeration and well dispersed particles.
(iii) The present invention also involves the microwave drying of the precipitate which is not reported in the prior art. Conventional drying step can also be used followed by roasting.
(iv) The calcination is carried out at a lower temperature compared to those reported in prior art.
(v) There is no need for any agglomeration steps like spray drying or pelletization followed by crushing as reported in prior art. The powder obtained after calcination is sieved to remove smaller particles.
(vi) The novelty of the process also lies in the fact that by using the same precipitating agent and just changing the method of precipitation from direct to reverse method, the particle shape can be modified from blocky angular to almost spherical shaped particles.

In present invention, preparation of plasma sprayable yttria stabilized zirconia involves the steps of:
a. dispersing yttrium (Y) precursor in distilled water,
b. dissolving said yttrium precursor solution in concentrated nitric acid to get yttrium nitrate precursor,
c. heating and simultaneously adding zirconia (Zr) precursor to acidic solution of yttrium nitrate precursor,
d. stirring the solution magnetically for at least 30 minutes for thorough molecular mixing,
e. adding precipitating agent to nitrates precursor solution till pH of solution reached to 10,
f. allowing the precipitate of Y and Zr to settle,
g. filtering the said precipitate,
h. washing the precipitate with distilled water followed by ethanol,
i. drying of washed precipitate and,
j. calcining the dried precipitate.

The following examples are given by way of illustrations and therefore, should not be construed to limit the scope of the present investigation.

EXAMPLE-1

Figure 1:
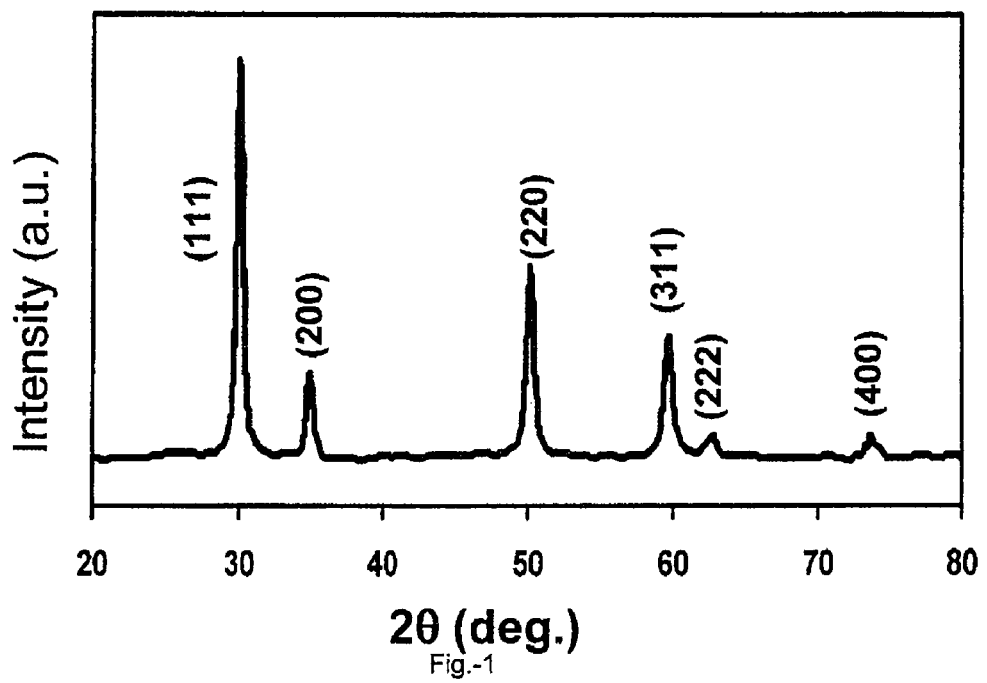
FIG. 1 is the drawings accompanying this specification showing the powder XRD pattern of 8YSZ prepared using direct co-precipitation using $Zr(NO_3)_4$ as precursor and ammonium sesquicarbonate as the precipitating agent.
Figure 2:
FIG. 2 is a photograph showing plasma-sprayed 8YSZ coating on ceramic tubes.

8 mol % YSZ was prepared as follows: 50 gm of Yttrium Oxide ($Y_{2\,3}$) was accurately weighed and dispersed in 100 mL of distilled water. Dispersed $Y_2O_3$ was dissolved in 173 mL of concentrated Nitric acid ($HNO_3$) to get Yttrium Nitrate ($Y(NO_3)_3$) solution The Yttrium Nitrate solution was slightly heated on a hot plate at temperature of 150° C. 864.75 gm of Zirconium nitrate ($Zr(NO_3)_4$) was added to $Y(NO_3)_3$ solution. This solution was thoroughly stirred for about 30 min in order to ensure proper mixing. The pH of the solution was checked and 4.8 M ammonium sesquicarbonate solution was added drop-wise. During the addition of ammonium sesquicarbonate solution, the Y and Zr ions are slowly precipitated. The pH of the solution increased with the addition of the precipitating agent. The pH of the solution was checked intermittently during the addition. The addition of the precipitating agent was continued till the pH of the solution reached 10. The white YSZ precipitate was allowed to settle overnight for 12 h. After this, the precipitate was filtered and was washed thoroughly with water followed by ethanol. The precipitate was dried in an oven at 120° C. for 12 hrs. After drying, the YSZ powder was calcined at 900° C. for 20 h. This was followed by sieving to remove the fine particles. The powder XRD pattern confirmed the formation of phase pure zirconia and SEM showed blocky angular shape particles. In FIG. 1 of the drawings accompanying this specification is shown the powder XRD pattern of 8YSZ prepared using direct co-precipitation using $Zr(NO_3)_4$ as precursor and ammonium sesquicarbonate as the precipitating agent. The average agglomerated particle size as determined by particle size analyzer was 51 μm. The flowability value as determined according to ASTM B213-97 was 31 s/50 g. The particles were plasma sprayed using the following plasma spray parameters on strontium doped lanthanum manganite (LSM) tubes with current of 660 A, voltage of 70 V, Argon flow rate of 42 NLPM, Hydrogen flow rate of 13 NLPM and spray distance of 15 cm. A photograph showing plasma-sprayed 8YSZ coating on ceramic tubes is shown in FIG. 2 of the drawings accompanying this specification. The thickness of the coating can be increased or decreased either by increasing or decreasing the number of plasma spray passes. The XRD pattern of the plasma sprayed 8YSZ coating confirmed the retention of cubic phase during plasma spraying as desired for SOFC application.

EXAMPLE-2

Figure 3:
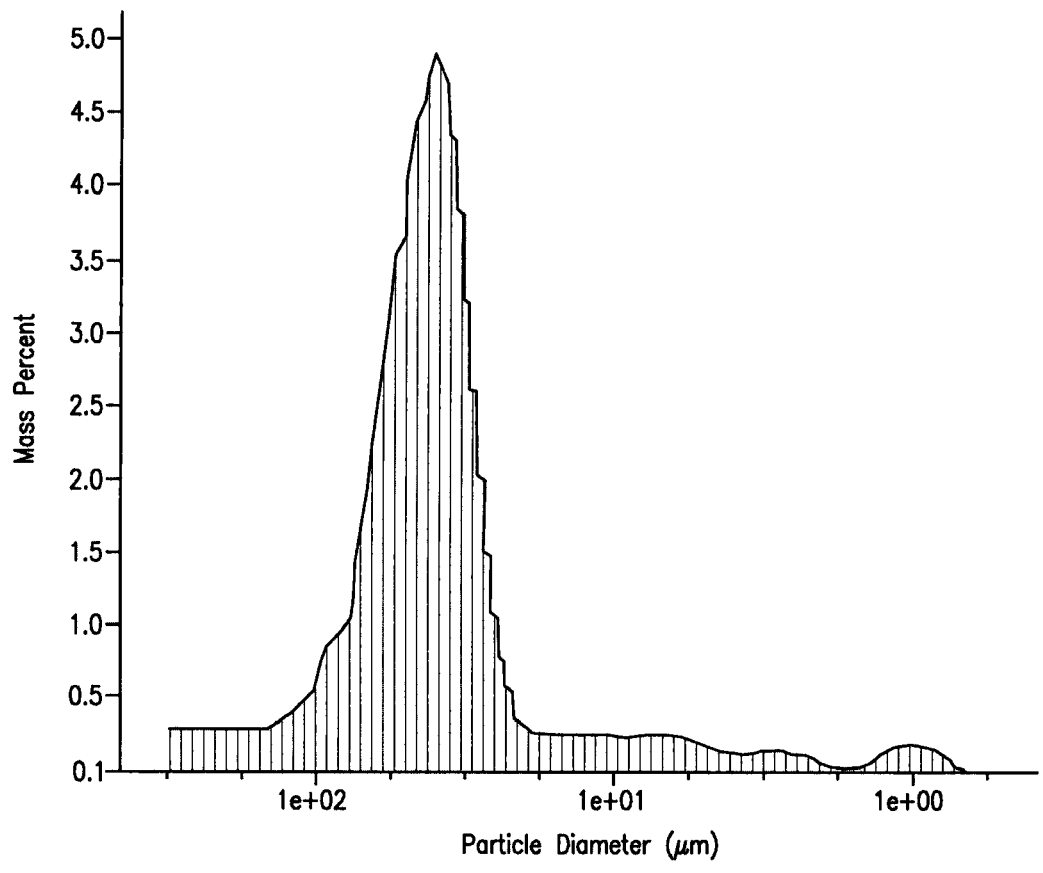
FIG. 3 shows the histogram depicting particle size distribution of 8YSZ particles prepared using ammonium sesquicarbonate as precipitating agent and $ZrOCl_2$ precursor.

8 mol % YSZ solution was prepared using Zirconium oxychloride ($ZrOCl_2$) precursor as follows: 30.465 g of $Y_2O_3$ was dissolved in 1:14 vol ratio of conc $HNO_3$:distilled water and slightly warmed to which 500 g of $ZrOCl_2$ was added. To this solution 500 mL of 4.8 M ammonium sesquicarbonate solution was added drop wise until the pH of the precipitate was 10. The stirring speed was 300 rpm initially and increased to 400 rpm once the precipitation starts. The addition rate of the precipitating agent was 2.5-10 mL/min and preferably 5 mL/min. Then the precipitate was mixed thoroughly, allowed to settle for 2 h, filtered, washed with distilled water several times and finally rinsed with ethanol. The precipitate was then dried in an oven at 120° C. for 12 h and finally calcined at 900° C. for 20 h. This was followed by sieving to remove finer particles. The flowability value was 45 s/50 g. The average agglomerated particle size as determined by particle size analyzer was 46 μm. In FIG. 3 of the drawings accompanying this specification, is shown the histogram depicting particle size distribution of 8YSZ particles prepared using ammonium sesquicarbonate as precipitating agent and $ZrOCl_2$ precursor. The particles were plasma sprayed using the same parameters as used in previous example and the XRD pattern confirms the phase retention of the cubic zirconia. In FIG. 4 of the drawings accompanying this specification is shown the XRD pattern of plasma coating sprayed using 8YSZ particles prepared using ammonium sesquicarbonate as precipitating agent and $ZrOCl_2$ as precursor.

EXAMPLE-3

8 mol % YSZ solution was prepared as follows: 30.465 g of $Y_2O_3$ was dissolved in 1:14 vol ratio of conc $HNO_3$:distilled water and slightly warmed to which 500 g of $ZrOCl_2$ was added. This solution was slowly added to 500 mL of 4.8 M ammonium sesquicarbonate solution until the pH of the precipitate was 10. The stirring speed was 300 rpm initially and increased to 400 rpm once the precipitation starts and the addition rate was 2.5-10 mL/min and preferably 5 mL/min. Then the precipitate was mixed thoroughly, allowed to settle for 2 h, filtered, washed with distilled water several times and finally rinsed with ethanol. The precipitate was then dried in an oven at 120° C. for 12 h and finally calcined at 900° C. for 20 h. This was followed by sieving to remove the very fine powder. The flowability value was 46 s/50 g. The average agglomerated particle size as determined by particle size analyzer was 39.90 gm. The powder XRD pattern confirmed the formation of phase pure zirconia and SEM showed nearly spherical shaped particles. In FIG. 5 of the drawings accompanying this specification is shown the SEM image of 8YSZ particles prepared using ammonium sesquicarbonate using reverse co-precipitation and $ZrOCl_2$.

EXAMPLE-4

8 mol % YSZ was prepared using mixture of precipitating agents as follows. 12.186 g $Y_2O_3$ and 200 g of $ZrOCl_2$ were dissolved in nitric acid solution (21 mL of Conc. Nitric acid and 479 mL of distilled water) to get a 500 mL nitrate solution. Then a mixture of 110 mL of $NH_3$ solution (25%) and 110 mL of ammonium sesquicarbonate solution (33 wt %) was added drop wise. The final pH was adjusted to 10 and the filtrate was mixed thoroughly, allowed to settle for 2 hours and filtered. The precipitate was washed with distilled water several times and finally rinsed with ethanol, dried in an oven at 120° C. for 12 hours and calcined at 900° C. for 20 h. This was followed by sieving to remove very fine powders. The flowability value was 54 s/50 g. The average agglomerated particle size as determined using particle size analyzer was 39 μm. The powder XRD pattern confirmed the formation of phase pure zirconia and SEM showed blocky angular shape particles and the particles could be plasma sprayed using the plasma spray parameters as discussed in the previous examples;

EXAMPLE-5

8 mol % YSZ solution was prepared as follows: 30.465 g of $Y_2O_3$ was dissolved in 1:14 vol ratio of conc $HNO_3$:distilled water and slightly warmed to which 500 g of $ZrOCl_2$ was added. 500 mL of 4.8 M ammonium sesquicarbonate solution was slowly added to this solution until the pH of the precipitate was 10. The stirring speed was 300 rpm initially and increased to 400 rpm once the precipitation starts and the addition rate was 2.5-10 mL/min and preferably 5 mL/min. Then the precipitate was mixed thoroughly, allowed to settle for 2 h, filtered, washed with distilled water several times and finally rinsed with ethanol. The precipitate was then dried in a domestic microwave oven using 50% of full power (1100 W) for 1.5 to 2 hours. The solid lump was crushed and finally calcined at 900° C. for 20 h. This was followed by sieving to remove very fine particles. The powder XRD pattern confirmed the formation of phase pure zirconia. SEM image of microwave processed (dried) powder showed blocky angular shape particles. In FIG. 6 of the drawings accompanying this specification is shown the SEM image of 8YSZ particles prepared using microwave drying step. The average agglomerated particle size as determined using particle size analyzer was 33 μm. The flowability value was 46 s/50 gm.

EXAMPLE-6

3 mol % YSZ was prepared as follows: 10.84 g of $Y_2O_3$ was dissolved in 1:13.15 vol ratio of conc $HNO_3$:distilled water and slightly warmed to which 500 g of $ZrOCl_2$ was added. 4.8 M ammonium sesquicarbonate solution was added slowly to this solution until the pH of the precipitate was 10. The stirring speed was 300 rpm initially and increased to 400 rpm once the precipitation starts and the addition rate was 2.5-10 mL/min and preferably 5 mL/min. The pH of the solution increased with the addition of the precipitating agent. The addition of the precipitating agent was continued till the pH of the solution reached 10. The YSZ precipitate was allowed to settle overnight. The precipitate was filtered and was washed thoroughly with water followed by ethanol. The precipitate was dried in an oven at 120° C. for 12 h. After drying, the YSZ powder was calcined at 900° C. for 20 h. The powder XRD pattern confirmed the formation of mixture of tetragonal and monoclinic zirconia which undergo phase transformation to tetragonal during plasma spraying. In FIG. 7 of the drawings accompanying this specification is shown the XRD of (a) as-prepared 3YSZ plasma sprayable powder and (b) plasma sprayed coating. The average agglomerated particle size as determined using particle size analyzer was 39 μm. The flowability value was 50 s/50 g. SEM showed blocky angular shape particles and they were plasma sprayed using the same parameters as discussed in the previous examples. The cross-sectional SEM shows the plasma sprayed 3YSZ coating as depicted in FIG. 8 of the drawings accompanying this specification.

EXAMPLE-7

4 mol % YSZ was prepared as follows: 14.6 g of $Y_2O_3$ was dissolved in 1:14 vol ratio of conc $HNO_3$:distilled water and slightly warmed to which 500 g of $ZrOCl_2$ was added. 500 mL of 4.8 M ammonium sesquicarbonate solution was slowly added to this solution until the pH of the precipitate was 10. The stirring speed was 300 rpm initially and increased to 400 rpm once the precipitation starts and the addition rate was 2.5-10 mL/min and preferably 5 mL/min. The pH of the solution increased with the addition of the precipitating agent. The addition of the precipitating agent was continued till the pH of the solution reached 10. The YSZ precipitate was allowed to settle overnight. The precipitate was filtered and was washed thoroughly with water followed by ethanol. The precipitate was dried in an oven at 120° C. for 12 h. After drying, the YSZ powder was calcined at 900° C. for 20 h. The powder XRD pattern confirmed the formation of mixture of tetragonal and cubic zirconia and SEM showed blocky angular shape particles.

EXAMPLE-8

6 mol % YSZ was prepared as follows: 22.36 g of $Y_2O_3$ was dissolved in 1:6.4 vol ratio of conc $HNO_3$:distilled water and slightly warmed to which 500 g of $ZrOCl_2$ was added. 4.8 M ammonium sesquicarbonate solution was added slowly to this solution until the pH of the precipitate was 10. The stirring speed was 300 rpm initially and increased to 400 rpm once the precipitation starts and the addition rate was 2.5-10 mL/min and preferably 5 mL/min. The pH of the solution increased with the addition of the precipitating agent. The addition of the precipitating agent was continued till the pH of the solution reached 10. The YSZ precipitate was allowed to settle overnight. The precipitate was filtered and was washed thoroughly with water followed by ethanol. The precipitate was dried in an oven at 120° C. for 12 h. After drying, the YSZ powder was calcined at 900° C. for 20 h. The powder XRD pattern confirmed the formation of cubic pure zirconia phase and SEM showed blocky angular shaped particles. The average agglomerated particle size as determined using particle size analyzer was 37gm. The flowability value was 50 s/50 g.

EXAMPLE -9

12 mol % YSZ was prepared as follows: 47.76 g of $Y_2O_3$ was dissolved in 1:3 vol ratio of conc $HNO_3$.distilled water and slightly warmed to which 500 g of $ZrOCl_2$ was added. 4.8 M ammonium sesquicarbonate solution was added slowly to this solution until the pH of the precipitate was 10. The stirring speed was 300 rpm initially and increased to 400 rpm once the precipitation starts and the addition rate was 2.5-10 mL/min and preferably 5 mL/min. The pH of the solution increased with the addition of the precipitating agent. The addition of the precipitating agent was continued till the pH of the solution reached 10. The YSZ precipitate was allowed to settle overnight. The precipitate was filtered and was washed thoroughly with water followed by ethanol. The precipitate was dried in an oven at 120° C. for 12 h. After drying, the YSZ powder was calcined at 900° C. for 20 h. The powder XRD pattern confirmed the formation of phase pure cubic zirconia and SEM showed blocky angular shape particles. The average agglomerated particle size as determined by particle size analyzer was 40 μm. The flowability value was 40 s/50 gm.

An important feature of the process of the present invention is that for every 100 grams of powder prepared, 75 grams of the powder (350-170 mesh size) possessed the required flowability for plasma spraying which indicates that the yield is of the order of 75%. About 25 grams contained smaller particles which can be again agglomerated or can be used for slurry spraying processes. Comparative values of flowability and average particle size of yttria stabilized zirconia plasma sprayable powders containing different mole % yttria are given in the following table:

| Sample name | Flowability value (s) | Average particle size (μm) |
|---|---|---|
| 3YSZ | 50 | 39 |
| 6YSZ | 50 | 37 |
| 8YSZ | 45 | 46 |
| 12YSZ | 40 | 40 |

From the above said examples it is clearly evident that the process of the present invention yields stabilized zirconia with the required phases, flowability and an average agglomerated size suitable for plasma spraying. The process is simple, in-expensive and does not involve the agglomeration steps and also less time consuming compared to the methods reported in the hitherto known prior-art.

Main advantages of the present invention are as follows:
1. Use of cheaper raw materials.
2. Simple steps and not laborious.
3. Harmful organic solvents are eliminated.
4. Use of microwave brings down the processing time by 10 hours.
5. No agglomeration processes.
6. % Yield is good.
7. Good flowability.
8. Potential for large-scale production.
9. Higher degree of reproducibility.
10. Cost analysis shows half the cost of commercial powder.
11. The particles easily melt at lower plasma power compared to commercial powders.

We claim:

1. A process for the production of plasma sprayable yttria stabilized zirconia (YSZ), which comprises:
    (a) dispersing yttrium (Y) precursor in distilled water to obtain dispersed yttrium precursor;
    (b) dissolving the dispersed precursor in concentrated nitric acid to get acidic solution of yttrium nitrate precursor;
    (c) heating and simultaneously adding zirconia (Zr) precursor to the acidic solution of yttrium nitrate precursor;
    (d) subjecting the solution so obtained to magnetic stirring for at least 30 minutes to effect thorough molecular mixing in the nitrate precursor solution;
    (e) adding precipitating agent to the resultant nitrate precursor solution until a pH of the solution reaches 10 and a precipitate containing Y and Zr is produced;
    (f) allowing the precipitate containing Y and Zr to settle;
    (g) filtering the precipitate;
    (h) washing the precipitate with distilled water followed by ethanol;
    (i) drying the washed precipitate; and,
    (j) calcining the dried precipitate.

2. The process of claim 1, wherein the yttria precursor is selected from the group of oxide containing yttrium such as yttrium oxide.

3. The process of claim 1, wherein the zirconia precursor is selected from the group of metal nitrates and chlorides containing zirconia such as zirconium nitrate, zirconium oxy nitrate and zirconium oxychloride.

4. The process of claim 1, wherein the precipitating agent is selected from ammonium carbonate group.

5. The process of claim 1, wherein the preferred precipitating agent is ammonium sesquicarbonate.

6. The process of claim 1, wherein the precipitation is carried out at room temperature.

7. The process of claim 1, wherein the precipitating agent is added to nitrate precursor solution or vice versa to get different morphology of powders.

8. The process of claim 1, wherein the precipitate is allowed to settle for a period of 2-12 hours.

9. The process of claim 1, the precipitate is allowed to settle for a period of about 2 hours and wherein drying is carried out in a microwave oven.

10. The process of claim 1, wherein the drying of washed precipitate is carried out in an electric oven at a temperature on the order of 120° C. for a period of about 12 hours.

11. The process of claim 1, wherein the drying of washed precipitate is carried out in an electric oven at a temperature on the order of 120° C. for a period of about 8 hours and wherein the dried precipitate is subsequently roasted on a hot-plate for a period of about 30 minutes.

12. The process of claim 1, wherein the calcination of dried precipitate is carried out in a muffle furnace at temperatures ranging from 700 to 1050° C. for a period of 10 to 30 hours.

13. A process for the preparation of chemically homogenous yttria stabilized zirconia sprayable powder for solid oxide fuel cell and thermal barrier coatings characterized by a flowability of 30 to 54 seconds per 50 gm of powder and an average particle size of 33 -51μm, comprising:
    (a) dispersing an yttrium (Y) precursor in distilled water;
    (b) adding concentrated nitric acid
    (c) heating and simultaneously adding a zirconium (Zr) precursor;
    (d) stirring for at least 30 minutes:
    (e) adjusting the pH of a mixture produced by (a)-(d) to about 10, wherein precipitation is induced;
    (f) isolating and washing a precipitate of (e);
    (g) drying the precipitate; and
    (h) calcining the dried precipitate, wherein the YSZ powder contains 3 -12 mol % of yttria having a particle size of about 33-51 μm and a flowability of 30-
54 seconds per
50 gm of powder.

14. The process of claim 13, wherein the powder has a particle morphology ranging from approximately spherical to blocky angular shape.

15. The process of claim 13, wherein the yttrium precursor is yttrium oxide.

16. The process of claim 13, wherein the zirconium precursor is a metal nitrate or a chloride.

17. The process of claim 13, wherein the pH is adjusted with a reagent that contains an ammonium carbonate group.

18. The process of claim 13, wherein the pH is adjusted with ammonium sesquicarbonate.

19. The process of claim 13, wherein the pH is adjusted at a temperature of about 20° C. to 25° C.

20. The process of claim 13, wherein the pH is adjusted by addition of a reagent to the mixture produced by (a)-(d).

21. The process of claim 13, wherein the pH is adjusted by addition of the mixture produced by (a)-(d) to a reagent.

22. The process of claim 13, wherein the precipitate is allowed to settle for about 2 to 12 hours.

23. The process of claim 13, further comprising drying the washed precipitate in a microwave oven.

24. The process of claim 13, further comprising drying the washed precipitate in an electric oven at a temperature of about 120 ° C. for a period of about 12 hours.

* * * * *